(12) United States Patent
Sarkar et al.

(10) Patent No.: US 12,019,874 B2
(45) Date of Patent: Jun. 25, 2024

(54) ADAPTIVE OPTIMIZATION OF ERROR-HANDLING FLOWS IN MEMORY DEVICES

(71) Applicant: MICRON TECHNOLOGY, INC., Boise, ID (US)

(72) Inventors: Jay Sarkar, San Jose, CA (US); Vamsi Pavan Rayaprolu, Santa Clara, CA (US); Ipsita Ghosh, Kolkata (IN)

(73) Assignee: Micron Technology, Inc., Boise, ID (US)

( * ) Notice: Subject to any disclaimer, the term of this patent is extended or adjusted under 35 U.S.C. 154(b) by 39 days.

(21) Appl. No.: 17/884,327

(22) Filed: Aug. 9, 2022

(65) Prior Publication Data

US 2024/0053893 A1 Feb. 15, 2024

(51) Int. Cl.
*G06F 12/00* (2006.01)
*G06F 3/06* (2006.01)

(52) U.S. Cl.
CPC .......... *G06F 3/0611* (2013.01); *G06F 3/0629* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2019/0278653 A1* | 9/2019 | Padilla, Jr. .......... | G06F 11/0793 |
| 2020/0160211 A1* | 5/2020 | Kumar .................... | G06N 3/08 |
| 2023/0154100 A1* | 5/2023 | Perry .................... | G06F 9/4881 |
| | | | 345/506 |

* cited by examiner

*Primary Examiner* — Daniel D Tsui
(74) *Attorney, Agent, or Firm* — Lowenstein Sandler LLP

(57) ABSTRACT

Systems and methods are disclosed including a memory device and a processing device operatively coupled to the memory device. The processing device can perform operations including applying an ordered set of error-handling operations to be performed on data residing in a segment of the memory device as an input to a trained machine learning model, wherein the trained machine learning model is based on latency data for previously-performed error-handling operations; and obtaining an output of the trained machine learning model, the output comprising a reordered set of error-handling operations to be performed on the data residing in the segment of the memory device, and wherein the reordered set adjusts an order of one or more error-handling operations of the ordered set of error-handling operations.

17 Claims, 8 Drawing Sheets

ERROR-HANDLING FLOW TABLE 410

| Original Rank | Step ID | Operation Parameter | Step Latency | Probability of Execution | Latency Cost | Reordered Rank |
|---|---|---|---|---|---|---|
| 1 | S1 | OP1 | L1 | P1 | C1 | 2 |
| 2 | S2 | OP2 | L2 | P2 | C2 | 3 |
| 3 | S3 | OP3 | ... | ... | ... | ... |
| 4 | S4 | OP4 | ... | ... | ... | ... |
| 5 | S5 | OP5 | ... | ... | ... | ... |
| 6 | S6 | OP6 | L6 | P6 | C6 | 1 |
| ... | ... | ... | ... | ... | ... | ... |

ADAPTIVE OPTIMIZATION OF ERROR-HANDLING FLOWS IN MEMORY DEVICES

TECHNICAL FIELD

Embodiments of the disclosure relate generally to memory sub-systems, and more specifically, relate to adaptive optimization of error-handling flows in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 4 illustrates example error-handling flow data in accordance with aspects of the present disclosure.

DETAILED DESCRIPTION

Figure 1:
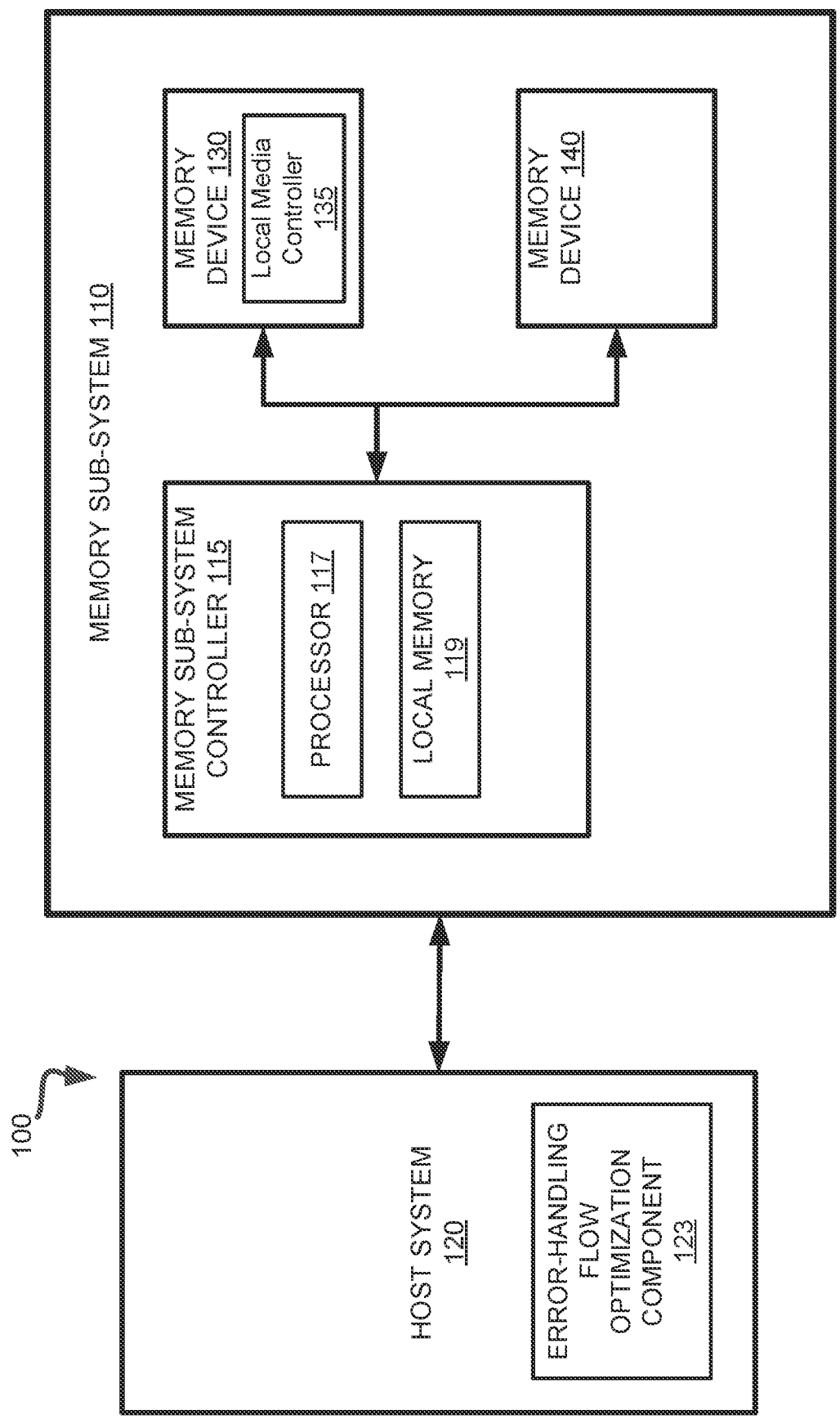
FIG. 1 illustrates an example computing system that includes a memory sub-system in accordance with some embodiments of the present disclosure.

Aspects of the present disclosure are directed to managing error-handling flows in memory devices. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. One example of a non-volatile memory device is a negative-and (NAND) memory device. Other examples of non-volatile memory devices are described below in conjunction with FIG. 1. Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values.

Various data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error-handling data (e.g., error correction code (ECC) codeword parity data), data version (e.g. used to distinguish age of data written), valid bitmap (which LBAs or logical transfer units contain valid data), etc.

A memory device includes multiple memory cells capable of storing, depending on the memory cell type, one or more bits of information. A memory cell can be programmed (written to) by applying a certain voltage to the memory cell, which results in an electric charge being held by the memory cell, which is called as the "threshold voltage" and denoted as Vt. A memory device can have distributions that are narrow compared with the working range of control voltages tolerated by the cells of the device. Accordingly, multiple distributions (with "valleys" between distributions) can be fit into the working voltage window allowing storing and reliably detecting multiple bits per cell such as 2 3=8 distributions (7 valleys) for TLC, $2^2$=4 distributions (3 valleys) for MLC etc. The distributions are interspersed with voltage intervals ("valley margins") between distributions where none (or very few) of the memory cells of the device have their threshold voltages. Therefore, such valley margins can be used to separate various charge states—the logical state of the cell can be determined by detecting, during a read operation by applying read voltages corresponding to each valley. This effectively allows a single memory cell to store multiple bits of information: a memory cell operated with $2^N$ distributions (which are also called levels) is capable of storing N bits of information. During the read operation, $2^N-1$ read voltages are applied to distinguish $2^N$ distributions. Specifically, the read operation can be performed by comparing the measured threshold voltage $V_T$ exhibited by the memory cell to one or more reference voltage levels corresponding to known valleys (e.g., centers of the valleys) of the memory device.

Due to the phenomenon known as slow charge loss (SCL), the threshold voltage $V_T$ of a memory cell can change with time as the electric charge of the cell is diminishing, the process sometimes referred to as "temporal voltage shift" (TVS). Since typical cells store negatively charged particles (electrons), the loss of electrons causes the voltage thresholds to shift along the voltage axis towards lower voltage thresholds $V_T$. The threshold voltages can change rapidly at first (immediately after the memory cell is programmed) while slowing down at larger times in an approximately log-linear or power-law fashion ($\Delta V_T(t)=-C*t^b$) with respect to the time t elapsed since the cell programming event. TVS can be mitigated by keeping track of the time elapsed since the programming event as well as of the environmental conditions of a particular memory partition (block, plane, etc.) such as temperature and associating a voltage offset $\Delta V_T$ per valley to be used during read operations, where the standard "base read level" threshold voltage $V_T$ (displayed by the cell immediately after programming) is modified by the voltage offset: $V_T \rightarrow V_T + \Delta V_T$ where $\Delta V_T$ is negative due to charge loss.

"Read error" refers to a memory sub-system's failure to validate one or more data items that have been retrieved from a memory device in response to a read command. Read errors can be associated with host-initiated read operations or system-initiated scanning operations and can occur due to, for example, the measured threshold voltage $V_T$ exhibited by the memory cell mismatching the read voltage levels due to TVS, the requested data being subjected to noise or interference, etc. In a read error, the number of bit errors in the read data is greater than what the underlying ECC can correct and this results in an ECC failure. In response to a read error, the memory sub-system can perform an error-handling flow in an attempt to recover the data. The error-handling flow can include one or more error-handling operations performed with respect to the data items that have been retrieved from the memory device. An error handling operation, for example, can include one or more read retries using different parameters, such as a change in read voltage, as compared to the initial read operation performed on the memory cell. The error-handling operation can also include "deep error handling techniques," such as forward error correction (FEC) with various versions of reliability information, hybrid automatic repeat request (HARQ), etc.

In conventional systems, the memory sub-system controller uses a default (e.g., static) error-handling flow, in which the order of the error-handling operations performed during an error-handling flow remains the same for all blocks of the memory device over the entire life of the memory sub-system. For example, the order of the error-handling operations may be initially set based on characterization data collected during product development, but remains static even as the actual operating conditions changes. Certain changes in operating conditions may result in inefficiencies in the predefined order of error-handling operations, such as increased latency. The inefficiencies cannot be addressed, however, due to the static order of the error handling operations. In some implementations, in response to sudden systematic changes to the memory sub-system, such as a sudden change in operating temperature (e.g., operating temperature rises 20° C. over a period of a few seconds), the memory sub-system controller can adjust the order of the error-handling operations performed during an error-handling flow by performing the last successful error handling-operation of an error-handling flow as the first error-handling operation in response to a new read error. These error-handling techniques, however, fail to consider both the latency measurements at a host or global level and aggregated latency information at a statistical level, which can result in time-consuming operations and impact performance of the memory sub-system, and increased read times and degraded performance as observed by the host system.

Aspects of the present disclosure improve the efficiency of error-handling operations by implementing a system controller capable of adaptively adjusting the order of error-handling operations in error-handling flows in memory devices. Data of operations at the customer environment with respect to workload including specific running applications for a specific customer are considered for optimizing the error-handling flows for a memory device or a batch of memory devices that are being used by the specific customer. The optimization can perform in real-time and dynamically adjust the error-handling flows using various data science methods including machine-learning models.

In some implementations, error-handling recovery log data are acquired at certain pre-defined intervals from memory devices (e.g., SSD populations) that are used by a customer. Such memory devices used by the customer may experience a specific pattern for workload, and the error-handling information related to the memory devices associated with the customer may be used to improve the future error-handling related to the memory devices associated with the customer. As such, a model, such as a machine learning model, can be built or constructed to optimize the error-handling related to the memory devices associated with the customer. For example, latency involved in the error-handling flow, which can be obtained from error-handling recovery log data, can be used to optimize the error-handling flow, e.g., re-order the error-handling operations in the error-handling flow. Although the model may be trained to apply to the specific memory devices associated with the customer, the model may also use data at a global level to generate a global model. For example, in one instance, data from the similar memory devices may be used for training the model, and in another instance, data from a user with similar workload may be used for training the model. In some implementations, number of executions of each error recovery step acts as "feature variables," and such execution frequencies, when translated to the system latency cost of each SSD, based on domain knowledge of system design, provides the "target variable" for the global model. The global model can be applied on features' importance (such as permutation importance and/or recursive feature importance) to obtain rank-ordered importance list of steps for latency cost or sensitivity to latency. Therefore, a re-order error-handling flow are provided with the consideration of latency-cost of each recovery step for specific drive population and experienced workloads. Thereafter, the SSD population can be updated with the re-order error-handling flow, which provides the best population latency customized to experienced workload. The updated error-handling flow, when executed, may provide additional error-handling recovery log data that can be used to further train the machine-learning model for optimization.

Advantages of the present disclosure include, but are not limited to, an improved performance of the memory sub-system by decreasing the latency of error-handling flows performed by the memory sub-system. This can result in an improvement of performance of the memory sub-system and a decrease in power consumption by the memory sub-system. Furthermore, this can increase the lifespan of the memory sub-system. Although embodiments are described using memory cells of a NAND flash memory, aspects of the present disclosure can be applied to other types of memory sub-systems.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO- DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g. 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local controller 132) on the die and a controller (e.g., memory sub-system controller 115) for media management within the same memory device package. An example of a managed memory device is a managed NAND (MNAND) device.

The host system 120 includes an error-handling flow optimization component 123 that can be used to implement the error handling strategies in accordance with embodiments of the present disclosure. In some embodiments, the memory sub-system 110 includes at least a portion of the error-handling flow optimization component 123. For example, the memory sub-system controller 115 can include a processor 117 (processing device) configured to execute instructions stored in local memory 119 for performing the operations described herein. In some embodiments, the error-handling flow optimization component 123 is part of an application, or an operating system. The error-handling flow optimization component 123 can optimize the error-handling operations associated with the memory device 130, as described in more detail herein below.

The error-handling flow optimization component 123 may monitor the error-handling recovery for a memory device (or a subset of the memory device) for a specific user device that have a workload using the memory device. The error-handling flow optimization component 123 may acquire the monitored data as error-handling recovery log data at certain pre-defined intervals or upon a change or update that triggers the acquisition (e.g., execution of a re-ordered error-handling flow). It is noted that some of error-handling recovery log data may be collected from a user device.

The error-handling flow optimization component 123 may generate, build, contrast, or train a machine-learning model using the error-handling recovery log data. In some implementations, the error-handling recovery log data may be associated with a specific memory device that is used by a specific user device performing a specific workload. In some implementations, the error-handling recovery log data may be associated with a similar population of the memory devices that are used by similar user devices performing similar workloads. With sufficient training data, the machine-learning model can be a global model that is applicable to various population of various memory devices with various workloads. For example, the workload can be read heavy, write heavy, retention centric, disruption centric, etc. The granularity of memory devices can be a die, a whole drive, or multiple drives.

The error-handling flow optimization component 123 may apply the machine-learning model to an error-handling flow to obtain a reordered rank of the error-handling operations in the error-handling flow. The error-handling flow optimization component 123 may send the reordered rank to the corresponding memory device to perform the error-handling operations in the adjusted order for the error-handling flow. The error-handling flow optimization component 123 may further use data of the operations in the reordered rank to update the error-handling recovery log data for training the machine-learning model.

Figure 2:
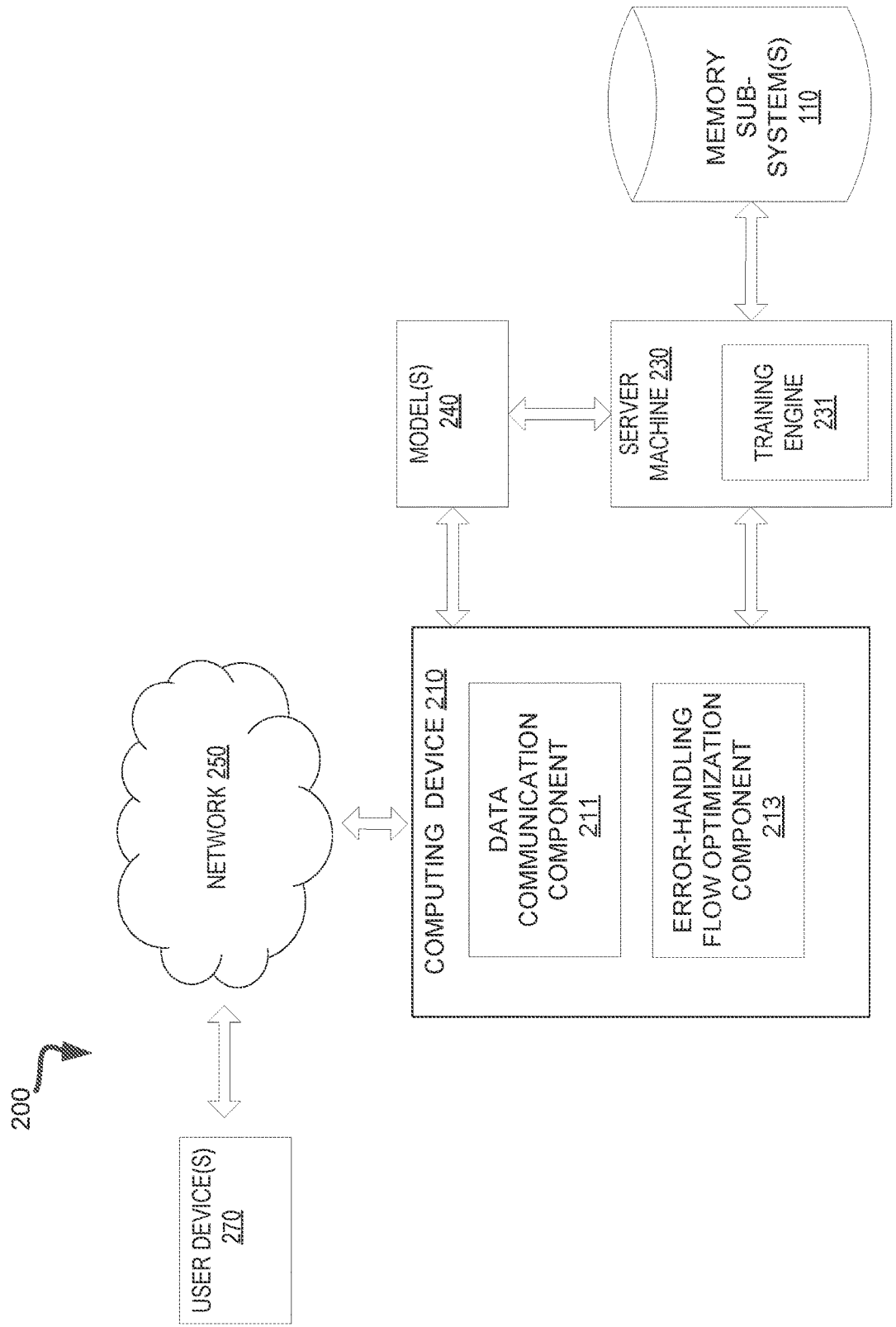
FIGS. 2-3 illustrate example system architectures that include user devices using memory sub-systems in accordance with some embodiments of the present disclosure

FIG. 2 illustrates an example system architecture 200 that includes user devices 270 using memory sub-systems 110 in accordance with some embodiments of the present disclosure. System architecture 200 includes memory sub-systems 110, a computing device 210, a server machine 230, user devices 270, and a network 250. Network 250 may be a public network (e.g., the Internet), a private network (e.g., a local area network (LAN) or wide area network (WAN)), or a combination thereof.

The user devices 270 may be a desktop computer, a laptop computer, a smartphone, a tablet computer, a server, or any suitable computing device capable of providing users different services through difference user interfaces, including applications, websites. In some implementations, the user device 270 provides an application that allows the user to have an option to provide latency data for specific workload with a unit of a memory device (e.g., a die, a whole SSD, or a SSD population) and an option to optimize the error-handling flow when using the unit of a memory device.

The computing device 210 may perform flow-handling flow optimization using artificial intelligence to effectively optimize the error-handling flow for a specific customer environment including workload, hardware, and environment for a memory device or multiple memory devices. The artificial intelligence may be in a form of a trained machine learning model. In one embodiment, computing device 110 may be a desktop computer, a laptop computer, a smartphone, a tablet computer, a server, or any suitable computing device capable of performing the techniques described herein. The computing device 310 may be a cloud service server.

In one implementation, the computing device 210 may include data communication component 211 and error-handling flow optimization component 213. The data communication component 211 may receive data from user devices 270, such as latency data for each of the error-handling operations that have been performed on the data residing in the segment of the memory device. The data communication component 211 may receive data from memory sub-systems 110, such as an ordered set of error-handling operations to be performed on data residing in the segment of the memory device. In some implementations, the latency data that are specific to a user device using a memory sub-system may be sent from the specific user device 270 to the specific memory sub-system 110 and saved as error-handling flow data, as the example shown in FIG. 4. The data communication component 211 may receive data described above constantly, for example, at certain intervals and save it as error-handling (or recovery) log data, which may be used as statistical data for training a machine learning model used for error-handling flow optimization.

The server machine 230 may include a training engine 231 to train one or more machine learning models and save the trained models as models 240. The set of machine learning models 240 may refer to model artifacts that are created by the training engine 231 using the training data that includes training inputs and corresponding target outputs (correct answers for respective training inputs). During training, patterns in the training data that map the training input to the target output (the answer to be predicted) can be found, and are subsequently used by the machine learning models 240 for future predictions. The set of machine learning models 114 may be composed of, e.g., a single level of linear or non-linear operations (e.g., a support vector machine [SVM]) or may be a deep network, i.e., a machine learning model that is composed of multiple levels of non-linear operations). Examples of deep networks are neural networks including convolutional neural networks, recurrent neural networks with one or more hidden layers, and fully connected neural networks. In some embodiments, the machine learning model may be a classification model or a regression model, and may be trained to generate a reordered set of error-handling operations from an input set of error-handling operations. In some embodiments, the training engine 231 provides a model training workflow (e.g., method 600 of FIG. 6) and the error-handling flow optimization component 213 provides a model application workflow (e.g., method 500 of FIG. 5).

The training engine 231 trains one or more machine learning models to find latency impact of each step in error-handling flow and to arrive at ranked latency costs for memory devices for workload specific to a user environment. The error-handling flow optimization component 213 applies the one or more trained machine learning models to perform reordering of the error-handling flow in real time for a specific user's workload. The training engine 231 and the error-handling flow optimization component 213 may communicate with each other or any component of the system 200 to training one or more machine learning models and achieve the error-handling flow optimization using the trained one or more machine learning models.

One type of machine learning model that may be used to perform some or all of the above tasks is a regression model. A regression model provides a function that describes the relationship between one or more independent (feature) variables and a response, dependent, or target variable. The regression model may include a linear regression model, a multiple regression model, a non-linear regression model, and stepwise regression model. For example, the regression model may use number of executions of each error recovery step as "feature variables," and system latency cost of each drive, based on domain knowledge of system design, as the "target variable."

Training of a model may be achieved in a supervised learning manner, which involves feeding a training dataset consisting of labeled inputs, observing its outputs, defining an error (by measuring the difference between the outputs and the label values), and using techniques such that the error is minimized. In many applications, repeating this process across the many labeled inputs in the training dataset yields a model that can produce a correct output when presented with inputs that are different than the ones present in the training dataset. In high-dimensional settings, such as heavy workload, this generalization is achieved when a sufficiently large and diverse training dataset is made available.

Although some specifications are illustrated above, it should be understood that the number and type of machine learning models that are used and the arrangement of such machine learning models can be modified to achieve the same or similar end results according to the aspects of the present disclosure. In some embodiments, one or more machine learning models are trained to perform one or more of the optimization tasks, for example, optimization for different workloads and/or different memory devices. Each task may be performed by a separate machine learning model. Alternatively, a single machine learning model may perform each of the tasks or a subset of the tasks. Additionally, or alternatively, different machine learning models may be trained to perform different combinations of the tasks. In one example, the trained machine learning model is a single shared neural network that has multiple shared layers and multiple higher level distinct output layers, where each of the output layers outputs a different order/rank optimization.

Figure 3:
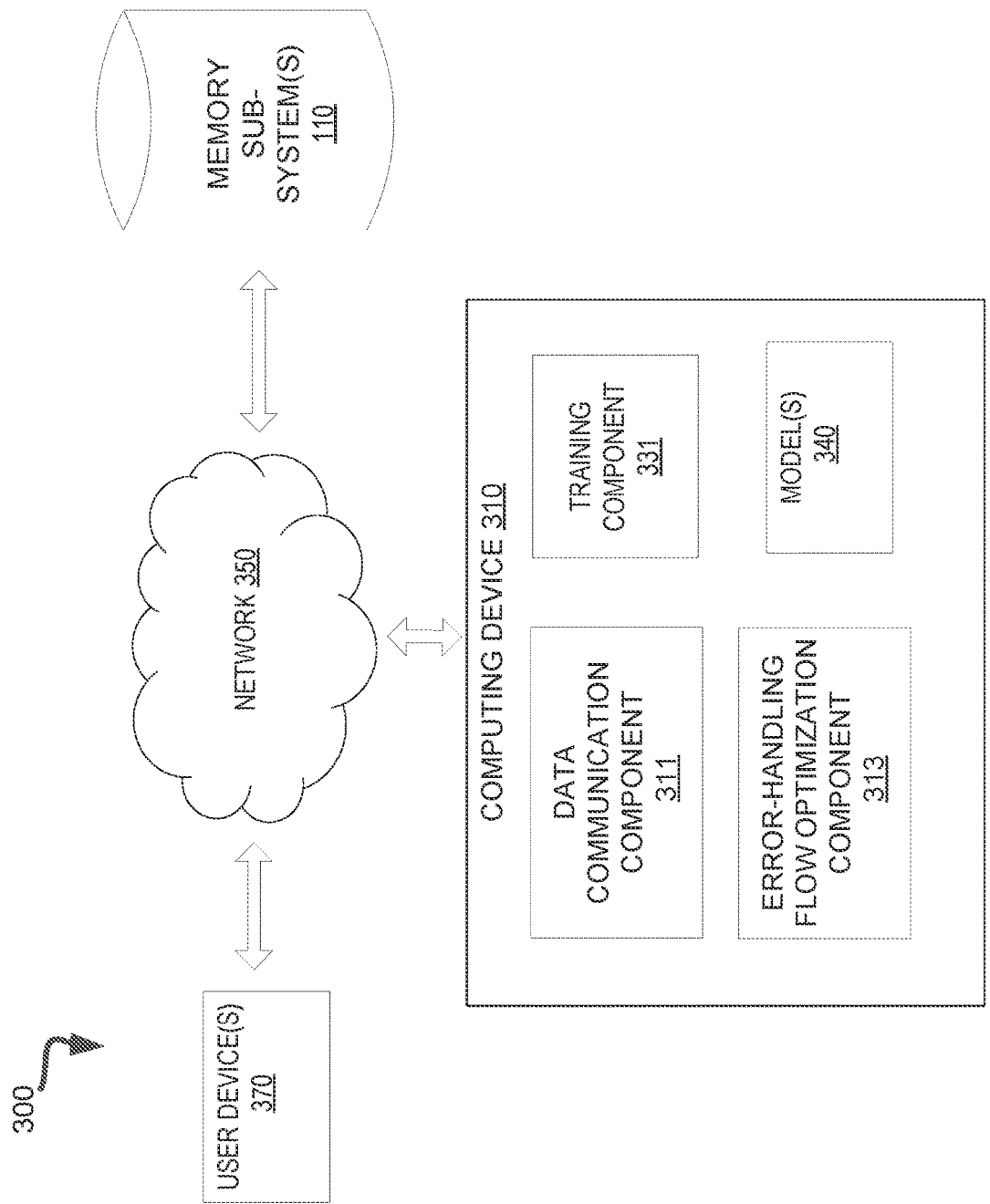

FIG. 3 illustrates an example system architecture 300 that includes user devices 370 using memory sub-systems 110, in accordance with some embodiments of the present disclosure. System architecture 300 includes memory sub-systems 110, a computing device 310, user devices 370, and a network 350. The user devices 370, the network 350, the memory sub-systems 110 may be same as or similar to the user devices 270, the network 250, the memory sub-systems 110 described above. The computing device 310 may include data communication component 311, error-handling flow optimization component 313, training component 331, and models 340, which may be same as or similar to the data communication component 211, error-handling flow optimization component 213, training engine 231, and models 240 described above. It is noted that although specific system architectures are shown in FIGS. 2-3, any or part of component or device in the system can be incorporated into other part of the system, separated into smaller components, or combined together, and the arrangement and number of the components and devices in the system and the communication among the components and devices can be modified as long as the end results according the present disclosure are achieved.

FIG. 4 schematically illustrates example error-handling flow data 400 in accordance with aspects of the present disclosure. The error-handling flow data 400 may be saved in a persistent storage that is capable of storing the error-handling flow data 400 (e.g., tables) as well as data structures to tag, organize, and index the error-handling flow data 400 (e.g., tables). Such persistent storage may be hosted by one or more storage devices, such as main memory, magnetic or optical storage based disks, tapes or hard drives, NAS, SAN, and so forth. In some implementations, the error-handling flow data 400 may be saved in a network-attached file server, while in other embodiments, the error-handling flow data 400 may be saved in other type of persistent storage such as an object-oriented database, a relational database, and so forth, that may be hosted by a server machine or one or more different machines coupled to the via a network.

In some embodiments, error-handling flow optimization component 123 can maintain an error-handling flow table 410. In some embodiments, error-handling metadata table 410 can be stored in memory of the memory sub-system (e.g., at memory device 130, 140, local memory 119, etc.) and can be referenced by error-handling flow optimization component 123 to determine a reordered error-handling flow.

As illustrated by error-handling flow table 410, each error-handling flow can be associated with a particular set of error-handling operations to be performed in a particular order (e.g., order of operations). The particular order may include an original rank and a reordered rank. Each error-handling operation can be associated with parameters, such as step ID, operation parameters (such as an indication of workload, or an identification of memory device), step latency, probability of execution, and latency cost. The step ID may represent an error-handling operation. The operation parameters may include an indication of a specific workload and an identification of a specific memory device or a specific part of a memory device. The step latency may be represented or calculated as a sum of latency including current and previous steps of the error-handling operation. The probability of execution may be represented or calculated as a ratio of the count of successful performance (i.e., successful recovery of the data) over all count of performance for the error-handling operation. The latency cost may be represented or calculated as an overall latency indication based on domain knowledge of memory device design as well as workload experience using different mythologies.

The training engine/component may use the above information in the error-handling flow table 410 to create a model that effectively represents optimized error-handling steps with latency impacted by workload experiences and memory device variations and achieves a minimum system latency for a given workload on a given memory device. For example, the model may be a regression model having the execution frequencies of each error recovery step as "feature variables" and the system latency cost of each drive, based on domain knowledge of system design, as "target variable." The trained model can output a reordered rank based on the original rank as shown in FIG. 4.

Figure 5:
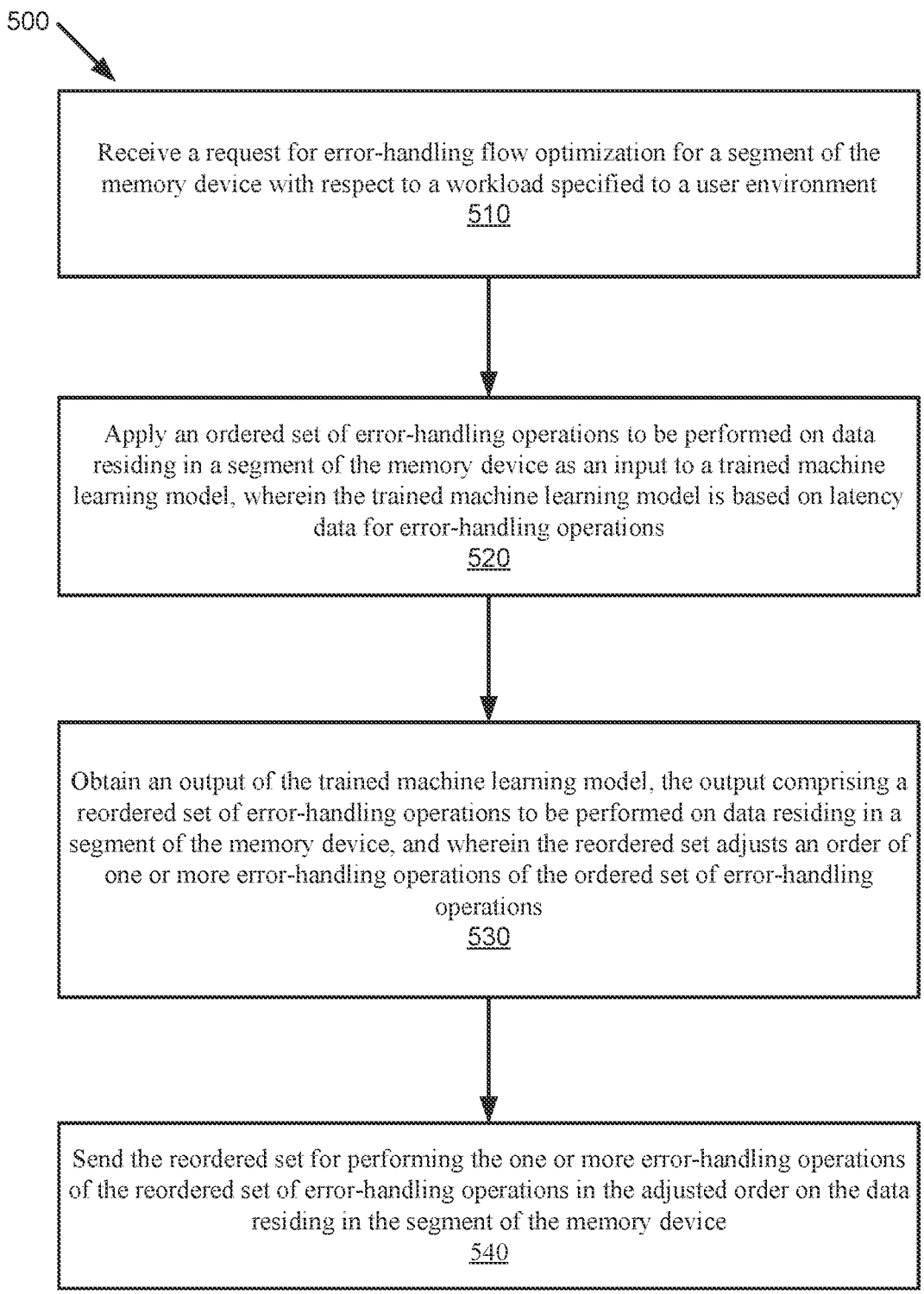
FIGS. 5-7 are flow diagrams of example methods of performing error-handling flow optimization in accordance with some embodiments of the present disclosure.

FIG. 5 is a flow diagram of an example method 500 of error-handling flow optimization in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the error-handling flow optimization component 123 of FIG. 1, the error-handling flow optimization component 213 of FIG. 2, or the error-handling flow optimization component 313 of FIG. 3. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 510, the processing logic may receive a request for optimization of error-handling flow for a segment of the memory device with respect to a workload specified to a user environment. In some implementations, an application running at the user device may detect a workload change and send a request for optimization of error-handling flow. In some implementations, an application running at the user device may detect an environment change (e.g., temperature change) and send a request for optimization of error-handling flow. In some implementations, an application running at the user device may detect a hardware change (e.g., a new memory device is used) and send a request for optimization of error-handling flow. In some implementations, a criterion for sending a request for optimization may be preset by a user. For example, the user may set the criterion so that the optimization request is sent every certain interval.

At operation 520, the processing logic may apply an ordered set of error-handling operations to be performed on data residing in the segment of the memory device as an input to a trained machine learning model, wherein the trained machine learning model is based on latency data for a plurality of error-handling operations. The ordered set of error-handling operations to be performed on data residing in the segment of the memory device is obtained in real time from the memory device, or a sub-system controller of the memory device.

At operation 530, the processing logic may obtain an output of the trained machine learning model, the output comprising a reordered set of error-handling operations to be performed on the data residing in the segment of the memory device, and wherein the reordered set adjusts an order of one or more error-handling operations of the ordered set of error-handling operations. For example, the processing logic may update the error-handling flow data (e.g. metadata) by replacing previous error-handling operation rank with the current error-handling operation rank. As another example, the processing logic may update the error-handling flow data (e.g. table) by adding the reordered error-handling operation rank in addition to the original error-handling operation rank as illustrated with respect to FIG. 4. As such, a real-time error-handling flow has been optimized for a segment of the memory device with respect to a workload specified to a user environment, and the optimization is based on latency data collected at a statistical level and is customized to the specific user's workload.

At operation 540, the processing logic may send the reordered set, to the memory device, or a sub-system controller of the memory device, for performing the one or more error-handling operations of the reordered set of error-handling operations in the adjusted order on the data residing in the segment of the memory device.

Figure 6:
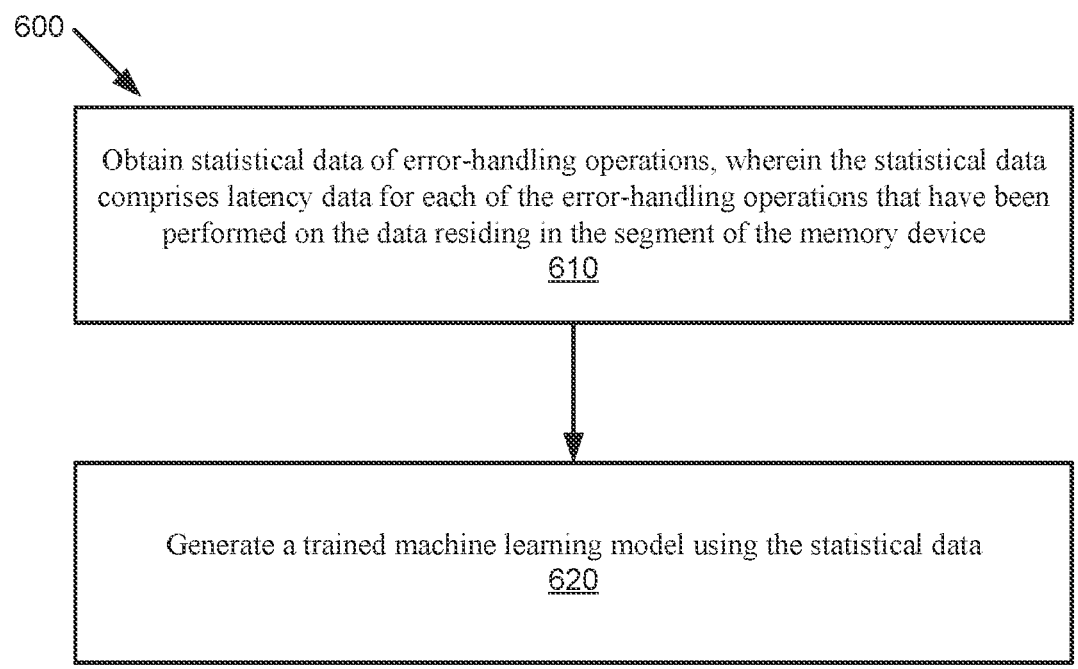

FIG. 6 is a flow diagram of an example method 600 of training a model for error-handling flow optimization in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the error-handling flow optimization component 123 of FIG. 1, the training engine 231 of FIG. 2, or the training component 331 of FIG. 3. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 610, the processing logic may obtain statistical data of error-handling operations, wherein the statistical data comprises latency data for each of the error-handling operations that have been performed on the data residing in the segment of the memory device. The statistical data may include error recovery log data at certain predefined intervals and error recovery log data upon a change/update is detected for data recovery performance. Some or all of the error recovery log data may be received from a memory device (e.g., SSD) or a segment of the memory device (e.g., a die of SSD) or multiple memory devices (e.g., SSD population). Some of the error recovery log data may be received from a device that is accessible by a user and saves it as user data. In some implementations, the statistical data may include latency data for each of the error-handling operations regarding a workload specified to a user environment, and the latency data may be received from a user device that performs the workload. The acquisition of statistical data at a host level provides a better optimization.

At operation 620, the processing logic may generate a trained machine-learning model using the statistical data. In some implementations, the processing logic may construct the model by vendor-unique commands. Details of the training and constructing of the model are illustrated with respect to FIGS. 1-4.

Figure 7:
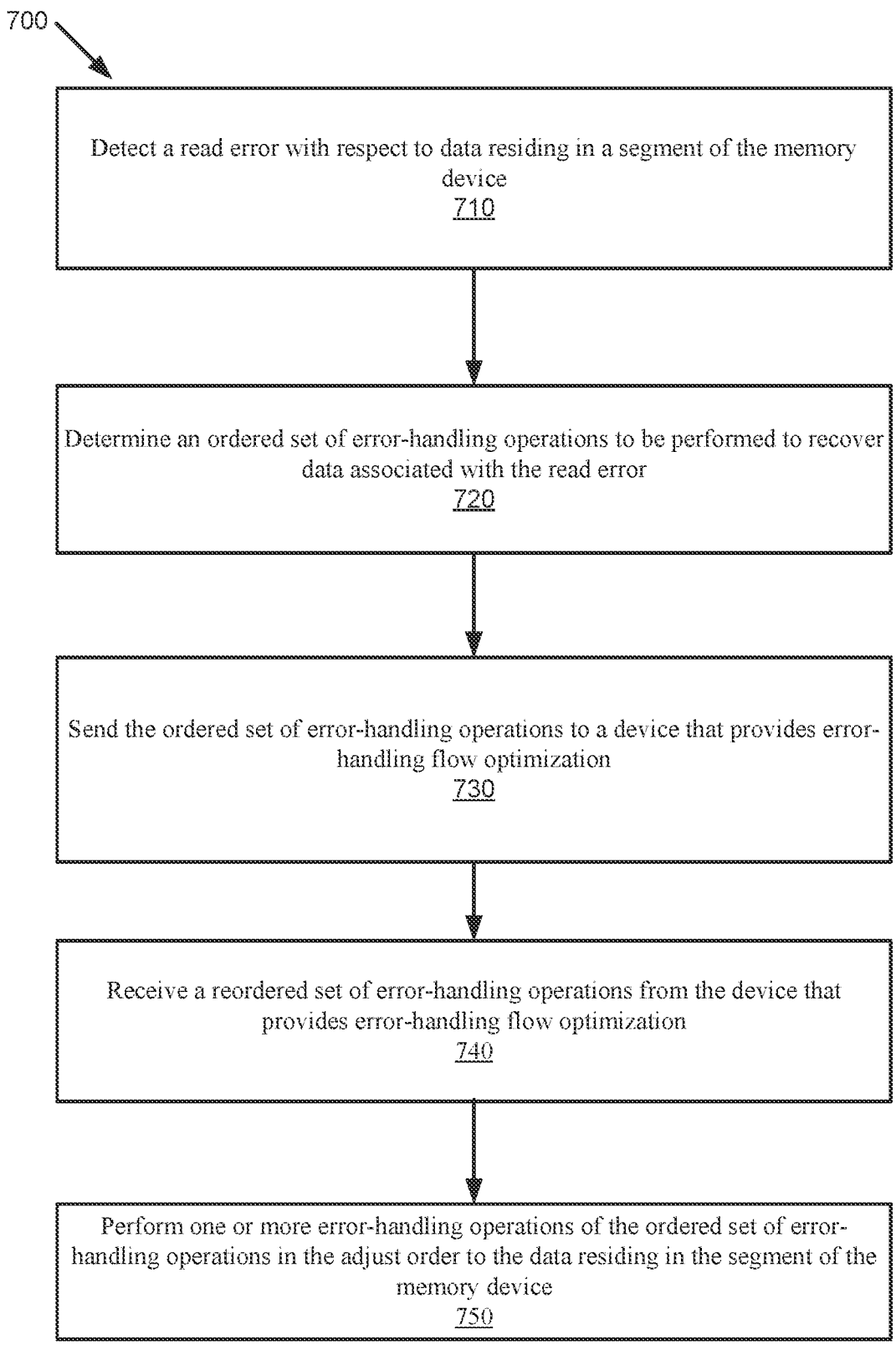

FIG. 7 is a flow diagram of an example method 700 of error-handling flow optimization in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the memory sub-system controller 115 of FIG. 1 or the memory sub-system 110 of FIGS. 1-3. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 710, the processing logic detects a read error with respect to data residing in a segment of the memory device.

At operation 720, the processing logic determines an ordered set of error-handling operations to be performed to recover data associated with the read error. For example, the processing logic can use error-handling flow data (e.g., metadata table 410) to determine the order of the error-handling operations (along with their parameters) specified by the error-handling flow.

At operation 730, the processing logic sends the ordered set of error-handling operations to a device that provides error-handling flow optimization (e.g., host system 120 of FIG. 1, server machine 230 of FIG. 2, or computing device 310 of FIG. 3).

At operation 740, the processing logic receives a reordered set of error-handling operations from the device that provides error-handling flow optimization (e.g., host system 120 of FIG. 1, server machine 230 of FIG. 2, or computing device 310 of FIG. 3).

At operation 750, the processing logic performs one or more error-handling operations of the ordered set of error-handling operations in the adjust order to the data residing in the segment of the memory device.

Figure 8:
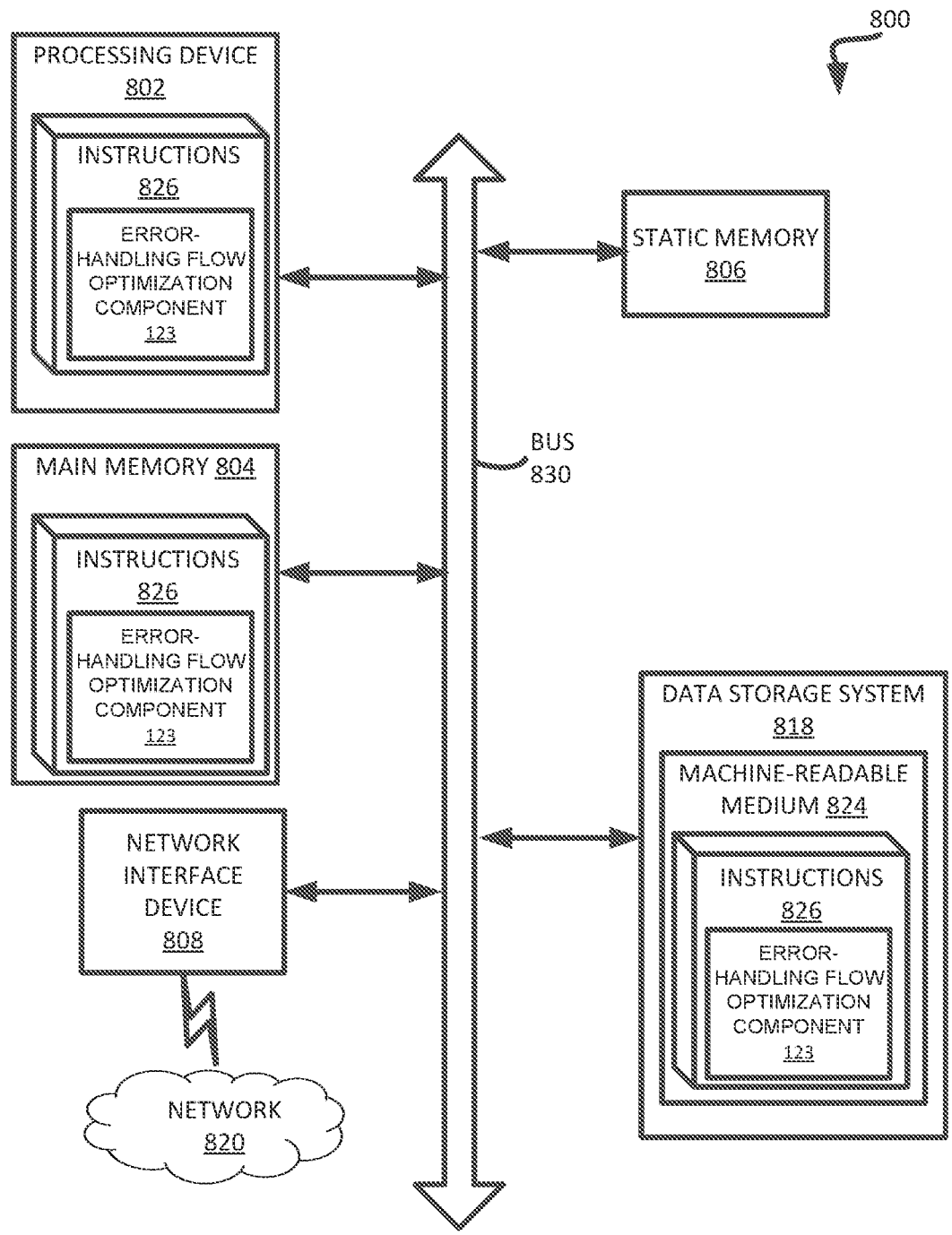
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to error-handling flow management component 123 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830. Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to error-handling flow management component 123 of FIG. 1. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled to the memory device, to perform operations comprising:
   applying an ordered set of error-handling operations to be performed on data residing in a segment of the memory device as an input to a trained machine learning model, wherein the trained machine learning model is based on latency data for previously-performed error-handling operations, wherein the latency data for the previously-performed error-handling operations depends on a workload of the segment of the memory device; and
   obtaining an output of the trained machine learning model, the output comprising a reordered set of error-handling operations to be performed on the data residing in the segment of the memory device, and wherein the reordered set adjusts an order of one or more error-handling operations of the ordered set of error-handling operations.

2. The system of claim 1, wherein the processing device is to perform operations further comprising:
- obtaining statistical data of the previously-performed error-handling operations, wherein the statistical data comprises the latency data for each of the previously-performed error-handling operations that have been performed on the data residing in the segment of the memory device; and
- generating the trained machine learning model using the statistical data.

3. The system of claim 1, wherein the processing device is to perform operations further comprising:
- receiving, from a controller of the memory device, the ordered set of the error-handling operations to be performed on the data residing in the segment of the memory device; and
- sending, to the controller of the memory device, the reordered set for performing the one or more error-handling operations of the reordered set of error-handling operations in the adjusted order to the data residing in the segment of the memory device.

4. The system of claim 1, wherein the trained machine learning model comprises a regression model and/or a classification model.

5. The system of claim 2, wherein the statistical data further comprises latency data for each of previously-performed error-handling operations that have been performed to data residing in other segments of the memory device.

6. The system of claim 2, wherein the statistical data further comprises latency data for each of previously-performed error-handling operations that have been performed to data residing in a plurality of memory devices.

7. The system of claim 1, wherein the processing device is to perform operations further comprising:
- receiving a request to initiate an error-handling flow optimization for the segment of the memory device.

8. The system of claim 7, wherein the request is received through an application accessible by a user device.

9. The system of claim 7, wherein the request is triggered in response to a change of the workload.

10. A method, comprising:
- applying, by a processing device, an ordered set of error-handling operations to be performed on data residing in a segment of a memory device as an input to a trained machine learning model, wherein the trained machine learning model is based on latency data for previously-performed error-handling operations, wherein the latency data for the previously-performed error-handling operations depends on a workload of the segment of the memory device; and
- obtaining, by the processing device, an output of the trained machine learning model, the output comprising a reordered set of error-handling operations to be performed on the data residing in the segment of the memory device, and wherein the reordered set adjusts an order of one or more error-handling operations of the ordered set of error-handling operations.

11. The method of claim 10, further comprising:
- obtaining statistical data of the previously-performed error-handling operations, wherein the statistical data comprises the latency data for each of the previously-performed error-handling operations that have been performed on the data residing in the segment of the memory device; and
- generating the trained machine learning model using the statistical data.

12. The method of claim 10, further comprising:
- receiving, from a controller of the memory device, the ordered set of the error-handling operations to be performed on the data residing in the segment of the memory device; and
- sending, to the controller of the memory device, the reordered set for performing the one or more error-handling operations of the reordered set of error-handling operations in the adjusted order to the data residing in the segment of the memory device.

13. The method of claim 10, further comprising:
- receiving a request to initiate an error-handling flow optimization for the segment of the memory device.

14. A non-transitory computer-readable storage medium comprising instructions that, when executed by a processing device operatively coupled to a memory, performs operations comprising:
- applying an ordered set of error-handling operations to be performed on data residing in a segment of a memory device as an input to a trained machine learning model, wherein the trained machine learning model is based on latency data for previously-performed error-handling operations, wherein the latency data for the previously-performed error-handling operations depends on a workload of the segment of the memory device; and
- obtaining an output of the trained machine learning model, the output comprising a reordered set of error-handling operations to be performed on the data residing in the segment of the memory device, and wherein the reordered set adjusts an order of one or more error-handling operations of the ordered set of error-handling operations.

15. The non-transitory computer-readable storage medium of claim 14, wherein the processing device to perform further operations comprising:
- obtaining statistical data of the previously-performed error-handling operations, wherein the statistical data comprises the latency data for each of the previously-performed error-handling operations that have been performed on the data residing in the segment of the memory device; and
- generating the trained machine learning model using the statistical data.

16. The non-transitory computer-readable storage medium of claim 14, wherein the processing device to perform further operations comprising:
- receiving, from a controller of the memory device, the ordered set of the error-handling operations to be performed on the data residing in the segment of the memory device; and
- sending, to the controller of the memory device, the reordered set for performing the one or more error-handling operations of the reordered set of error-handling operations in the adjusted order to the data residing in the segment of the memory device.

17. The non-transitory computer-readable storage medium of claim 14, wherein the processing device to perform further operations comprising:
- receiving a request to initiate an error-handling flow optimization for the segment of the memory device.

* * * * *